(12) United States Patent
Hall

(10) Patent No.: US 7,358,345 B2
(45) Date of Patent: Apr. 15, 2008

(54) DISPERSE AZO DYESTUFFS

(75) Inventor: Nigel Hall, Lancs (GB)

(73) Assignee: Dystar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 10/575,599

(22) PCT Filed: Oct. 15, 2004

(86) PCT No.: PCT/EP2004/011590

§ 371 (c)(1),
(2), (4) Date: Apr. 13, 2006

(87) PCT Pub. No.: WO2005/040283

PCT Pub. Date: May 6, 2005

(65) Prior Publication Data

US 2007/0050928 A1    Mar. 8, 2007

(30) Foreign Application Priority Data

Oct. 21, 2003  (GB)  ................. 0324584.2

(51) Int. Cl.
*C09B 29/01*  (2006.01)
*C09B 29/033*  (2006.01)
*C09B 29/042*  (2006.01)
*C09B 29/085*  (2006.01)
*C09B 29/09*  (2006.01)

(52) U.S. Cl. .............. 534/753; 534/761; 534/788; 534/795; 534/852; 534/854; 8/662; 8/687; 8/690; 8/691; 8/693; 8/922

(58) Field of Classification Search ............. 534/753, 534/761, 788, 795, 852, 854; 8/662, 687, 8/690, 691, 693, 922
See application file for complete search history.

(56) References Cited

U.S. PATENT DOCUMENTS 3,097,198 A * 7/1963 Fishwick et al. .......... 534/852
3,544,550 A   12/1970 Anderton et al.
3,553,190 A   1/1971 Anderton et al.
3,776,898 A   12/1973 Stanley et al.
4,119,624 A * 10/1978 Boyd et al. ............. 534/851
4,224,026 A   9/1980 Reinhardt
5,569,751 A   10/1996 Buhler

FOREIGN PATENT DOCUMENTS

| DE | 21 30 992   | 12/1971 |
| DE | 28 11 167   | 9/1979  |
| EP | 0 685 531   | 12/1995 |
| FR | 1531147     | 7/1967  |
| GB | 909843      | 11/1962 |
| GB | 1321902     | 7/1973  |
| GB | 1351381     | 4/1974  |
| GB | 1457532     | 12/1976 |
| GB | 1536429     | 12/1978 |
| GB | 2104088     | 3/1983  |
| GB | 2335924     | 10/1999 |
| JP | 55-161857   | 12/1980 |
| WO | WO-95/20014 | 7/1995  |
| WO | WO-99/50357 | 10/1999 |

OTHER PUBLICATIONS

Borovas, Chemical Abstracts, 102:26342, 1985.*

* cited by examiner

*Primary Examiner*—Fiona T Powers
(74) *Attorney, Agent, or Firm*—Connolly Bove Lodge & Hutz LLP

(57) ABSTRACT

The present invention claims dyestuffs of formula (I), wherein D, $R^1$ to $R^7$ and n are defined as given in claim 1, a process for their preparation and their use

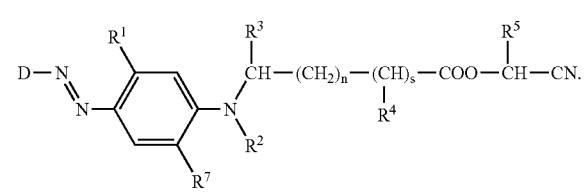

10 Claims, No Drawings

DISPERSE AZO DYESTUFFS

RELATED APPLICATIONS

This application is a national stage application (under 35 U.S.C. 371) of PCT/EP2004/011590 filed Oct. 15, 2004 which claims benefit to United Kingdom application 0324584.2 filed Oct. 21, 2003.

The present invention relates to the field of disperse dyes.

Disperse dyestuffs containing cyanomethyl ester groups are known from literature and are described for example in GB 909,843, DE-A 2130992, GB 1,457,532, GB 1,536,429, FR-A 1,531,147, U.S. Pat. No. 3,776,898, JP 55161857, GB 2,104,088, EP 0 685 531 A1 and WO 95/20014.

The inventor of the present invention has surprisingly found that dyeings on polyester with very good wet fastness properties can be obtained if selected dyestuffs containing one cyanomethylester group as defined below are used.

The present invention claims dyestuffs of the formula I

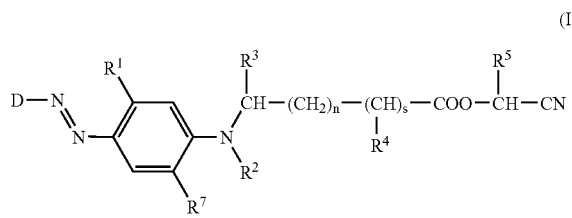

wherein
D is a group of the formula (IIa)

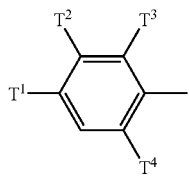

wherein
$T^1$, $T^2$ and $T^3$ are, independently, hydrogen, halogen or nitro;
$T^4$ is hydrogen, halogen, cyano or nitro;
wherein at least one of $T^1$, $T^2$, $T^3$ and $T^4$ is not hydrogen;
or a group of the formula (IIb)

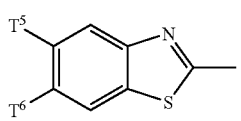

wherein
$T^5$ is hydrogen or halogen; and
$T^6$ is hydrogen —$SO_2CH_3$, —SCN or nitro;
wherein at least one of $T^5$ and $T^6$ is not hydrogen;
or a group of the formula (IIc)

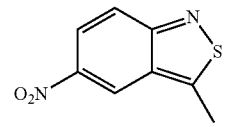

or a group of the formula (IId)

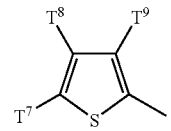

wherein
$T^7$ is nitro, —CHO or a group of the formula

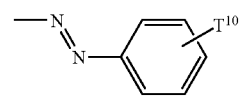

wherein $T^{10}$ is —H, halogen, nitro and cyano;
$T^8$ is hydrogen or halogen; and
$T^9$ is nitro, cyano, —$COCH_3$ or —$COOT^{10}$, wherein $T^{10}$ is $(C_1-C_4)$-alkyl;
or a group of the formula (IIe)

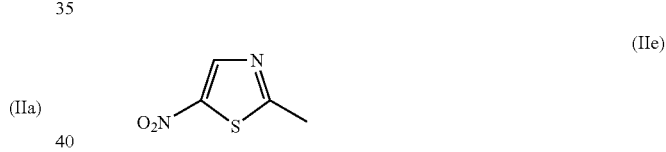

$R^1$ is hydrogen, $(C_1-C_4)$-alkyl or —$NCOR^6$, where $R^6$ is $(C_1-C_4)$-alkyl or phenyl;
$R^2$ is unsubstituted $(C_1-C_6)$-alkyl, substituted $(C_1-C_6)$-alkyl, benzyl or phenylethyl;
$R^3$ is hydrogen or methyl;
$R^4$ is hydrogen or methyl;
$R^5$ is hydrogen, methyl or phenyl;
$R^7$ is hydrogen, chloro, methoxy or ethoxy;
n is 0, 1 or 2;
s is 0 or 1;
with the proviso that
in the case $R^1$, $R^3$, $R^4$, $R^5$ and $R^7$ are hydrogen and n=0
D is a group of the formula (IIc), (IId), (IIe) or (IIa) wherein
  $T^1$ is not nitro
  if $T^2$, $T^3$ and $T^4$ are hydrogen,
  if $T^2$ and $T^3$ are hydrogen and $T^4$ is chlorine or cyano and
  if $T^2$ and $T^4$ are hydrogen and $T^3$ is chlorine; and
with the further proviso that
$R^2$ is unsubstituted $(C_1-C_6)$-alkyl if $R^1$ is methyl, $R^3$, $R^4$, $R^5$ and $R^7$ are hydrogen and n=0.

Alkyl groups standing for $R^1$, $R^8$ or $T^{10}$ may be straight-chain or branched and are preferably methyl, ethyl, n-propyl, i-propyl or n-butyl. The same applies to alkyl groups standing for $R^2$, which can in addition be pentyl or hexyl. Substituted alkyl groups standing for $R^2$ are preferably substituted by hydroxyl, $(C_1-C_4)$-alkoxy or halogen.

Halogen standing for $T^1$, $T^2$, $T^3$, $T^4$, $T^5$ or $T^8$ are preferably chlorine or bromine.

Preferred examples for D derive from the following amines:

2-nitroaniline, 3-nitroaniline, 4-nitroaniline, 2-chloro-4-nitroaniline, 4-chloro-2-nitroaniline, 2-bromo-4-nitroaniline, 2,6-dichloro-4-nitroaniline, 2,6-dibromo-4-nitroaniline, 2-chloro-6-bromo-4-nitroaniline, 2,5-dichloro-4-nitroaniline, 2-cyano-4-nitroaniline, 2-cyano-6-bromo-4-nitroaniline, 2-cyano-6-chloro-4-nitroaniline, 2,4-dinitroaniline, 2-chloro-4,6-dinitroaniline, 2-bromo-4,6-dinitroaniline, 2,6-dicyano-4-nitroaniline, 2-cyano-4,6-dinitroaniline, 2-amino-5-nitrothiazole, 2-amino-3,5-dinitrothiophene, 2-amino-3-ethoxycarbonyl-5-nitrothiophene, 2-amino-3-acetyl-5-nitrothiophene, 2-amino-3-cyano-5-nitrothiophene, 2-amino-3-cyano-4-chloro-5-formylthiophene, 7-amino-5-nitrobenzoisothiazole, 2-amino-6-nitrobenzothiazole, 2-amino-6-methylsulphonylbenzothiazole; 2-amino-6-thiocyanatobenzothiazole, 2-amino-5,6-dichlorobenzothiazole and 2-amino-6,7-dichlorobenzothiazole (mixture).

Preferred disperse dyestuffs according to the present invention are of the general formula (Ia)

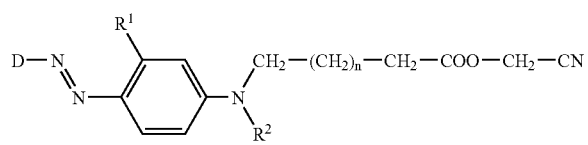

(Ia)

wherein

D is a group of the formulae (IIa), (IIb), (IIc), (IId) or (IIe);
$R^1$ is $(C_1-C_4)$-alkyl;
$R^2$ is unsubstituted $(C_1-C_6)$-alkyl, benzyl or phenylethyl; and
n is 0, 1 or 2.

In especially preferred dyestuffs of formula (Ia) $R^1$ is methyl, $R^2$ is ethyl and n is 0.

Other preferred disperse dyestuffs according to the present invention are of the general formula (Ib)

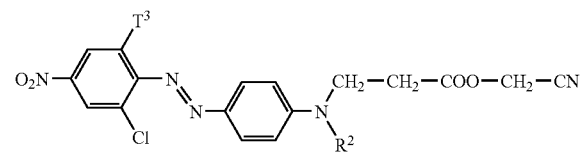

(Ib)

wherein $T^3$ is bromo or chloro; and
$R^2$ is unsubstituted $(C_1-C_8)$-alkyl, substituted $(C_1-C_6)$-alkyl, benzyl or phenylethyl;

In especially preferred dyestuffs of formula (Ib) $R^2$ is ethyl, benzyl or phenethyl.

Still other preferred disperse dyestuffs according to the present invention are of the general formula (Ic)

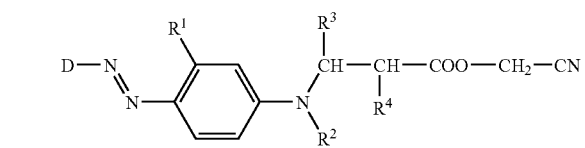

(Ic)

wherein

D is a group of the formulae (IIa), (IIb), (IIc), (IId) or (IIe);
$R^1$ is hydrogen, $(C_1-C_4)$-alkyl or $-NCOR^6$, where $R^6$ is $(C_1-C_4)$-alkyl or phenyl;
$R^2$ is unsubstituted $(C_1-C_8)$-alkyl, substituted $(C_1-C_8)$-alkyl, benzyl or phenylethyl; and
$R^3$ is hydrogen and $R^4$ is methyl or $R^3$ is methyl and $R^4$ is hydrogen.

Still other preferred disperse dyestuffs according to the present invention are of the general formula (Id)

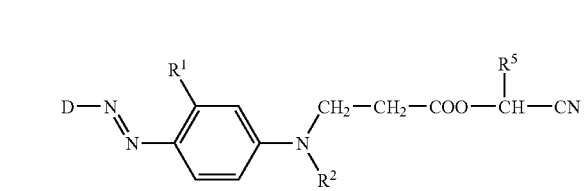

(Id)

wherein

D is a group of the formulae (IIa), (IIb), (IIc), (IId) or (IIe);
$R^1$ is hydrogen, $(C_1-C_4)$-alkyl or $-NCOR^6$, where $R^6$ is $(C_1-C_4)$-alkyl or phenyl;
$R^2$ is unsubstituted $(C_1-C_6)$-alkyl, substituted $(C_1-C_6)$-alkyl, benzyl or phenylethyl; and
$R^5$ is methyl or phenyl;

Still other preferred disperse dyestuffs according to the present invention are of the general formula (Ie)

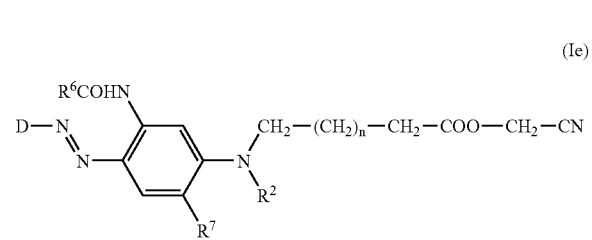

(Ie)

wherein

D is a group of the formulae (IIa), (IIb), (IIc), (IId) or (IIe);
$R^2$ is unsubstituted $(C_1-C_6)$-alkyl, substituted $(C_1-C_6)$-alkyl, benzyl or phenylethyl;
$R^6$ is $(C_1-C_4)$-alkyl or phenyl;
$R^7$ is chloro, methoxy or ethoxy; and
n is 0, 1 or 2.

Still other preferred disperse dyestuffs according to the present invention are of the general formula (If)

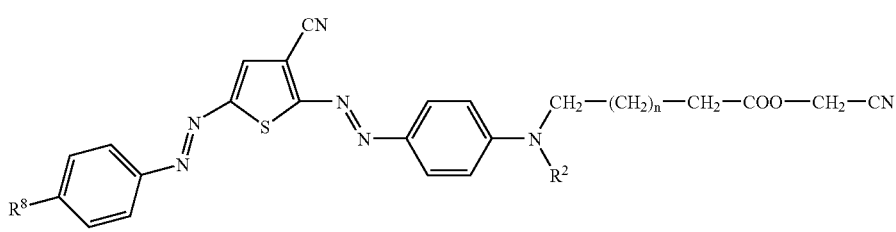

wherein
$R^2$ is unsubstituted $(C_1-C_6)$-alkyl, substituted $(C_1-C_6)$-alkyl, benzyl or phenylethyl;
$R^8$ is nitro; and
n is 0, 1 or 2;

Still other preferred disperse dyestuffs according to the present invention are of the general formula (Ig)

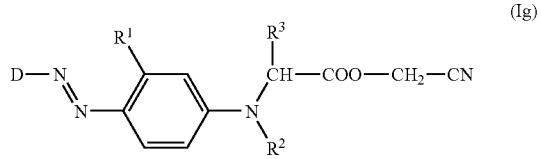

wherein
D is a group of the formulae (IIa), (IIb), (IIc), (IId) or (IIe);
$R^1$ is hydrogen, $(C_1-C_4)$-alkyl or —NCOR$^6$, where $R^6$ is $(C_1-C_4)$-allyl or phenyl;
$R^2$ is unsubstituted $(C_1-C_6)$-alkyl, substituted $(C_1-C_6)$-alkyl, benzyl or phenylethyl; and
$R^3$ is hydrogen or methyl.

The compounds of the formula I may be obtained by usual methods for the preparation of azo compounds such as by diazotisation of an amine of the formula III

wherein D is defined as given above,
and coupling onto a compound of the formula IV

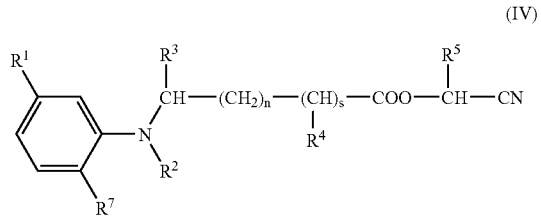

wherein $R^1$, $R^2$, $R^3$, $R^4$, $R^5$ and $R^7$ are defined as given above.

Typically the amine of the formula (III) may be diazotised in an acidic medium, such as acetic, propionic or hydrochloric acid, sodium nitrite or methylnitrite at a temperature from −10° C. to 10° C. Coupling onto the compound of the formula (IV) may be achieved by adding the diazotised amine to the compound of the formula (IV) under conditions described in literature and known to the skilled persons.

After coupling the compound of the formula (I) may be recovered from the reaction mixture by any convenient means such as filtration.

The compounds of the formulae (III) and (IV) are known and can be obtained by methods described in literature or known to the skilled person.

The compounds of the formula (I) are useful for dyeing and printing of synthetic textile material particularly polyester textile materials and fibre blends thereof with for example cellulosic materials like cotton, to which they impart colours which have excellent wet fastness properties.

Dyeing of the fibre goods mentioned with the dyestuffs of the formula (I) can be carried out in a manner known per se, preferably from aqueous dispersions, if appropriate in the presence of carriers, at between 80 and 110° C., by the exhaust process or by the HT process in a dyeing autoclave at 110 to 140° C., and by the so-called thermofixing process, in which the goods are padded with the dye liquor and then fixed at about 180 to 230° C.

The fibre goods mentioned can as well be printed in a manner known per se by a procedure in which the dyestuffs of the formula (I) are incorporated into a printing paste and the goods printed with the paste are treated, if appropriate in the presence of a carrier, with HT steam, pressurized steam or dry heat at temperatures between 180 and 230° C. to fix the dyestuff.

The dyestuffs of the formula (I) should be present in the finest possible dispersion in the dye liquors and printing pastes employed in the above applications.

The fine dispersion of the dyestuffs is effected in a manner known per se by a procedure in which the dyestuff obtained during preparation is suspended in a liquid medium, preferably in water, together with dispersing agents and the mixture is exposed to the action of shearing forces, the particles originally present being comminuted mechanically to the extent that an optimum specific surface area is achieved and sedimentation of the dyestuff is as low as possible. The particle size of the dyestuffs is in general between 0.5 and 5 m, preferably about 1 m.

The dispersing agents used can be nonionic or anionic. Nononic dispersing agents are, for example, reaction products of alkylene oxides, such as, for example, ethylene oxide or propylene oxide, with alkylatable compounds, such as for example fatty alcohols, fatty amines, fatty acids, phenols, alkylphenols and carboxylic acid amines. Anionic dispersing agnets are, for example, lignin-sulphonates, alkyl- or alkylarylsulphonates or alkylaryl polyglycol ethersulphates. For most methods of use, the dyestuff formulations thus obtained should be pourable. The dyestuff and dispersing agent content is therefore limited in these cases. In general, the dispersions are brought to a dyestuff content of up to 50 percent by weight and a dispersing agent content of up to 25 percent by weight. For economic reasons, the dyestuff contents usually do not fall below 15 percent by weight.

The dispersions can also comprise other auxiliaries, for example those which act as oxidizing agents or fungicidal agents. Such agents are well known in the art. The dyestuff dispersion thus obtained can be used very advantageously for the preparation of printing pastes and dye liquors.

For certain fields of use, powder formulations are preferred. These powders comprise the dyestuff, dispersing agents and other auxiliaries, such as, for example, wetting agents, oxidizing agents, preservatives and dust removal agents.

A preferred preparation process for pulverulent dyestuff formulations comprises removing the liquid from the liquid dyestuff dispersions described above, for example by vacuum drying, freeze drying, by drying on roller dryers, but preferably by spray drying.

EXAMPLE 1

4-(4-nitrophenylazo)-3-methyl-N-ethyl-N-(2-cyanomethoxy-carbonylethyl)aniline

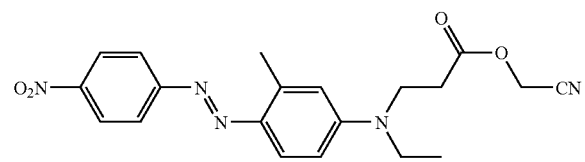

4-nitroaniline (4.1 parts) was set stirring at 5° C. with a mixture of acetic acid and propionic acid, 86:14 (50 parts). Nitrosyl sulphuric acid 40% (11.4 parts) was added below 5° C. and the mixture was stirred for 30 minutes.

The diazo solution obtained was added gradually to a stirred coupling mixture of N-ethyl, N-(2-cyanomethoxy-carbonylethyl)-m-toluidine (7.3 parts), methanol (50 parts), water (200 parts) and sulphamic acid (1 part). After two hours the product was isolated by filtration, washed with cold water and dried to yield, 4-(4-nitrophenylazo)-3-methyl-N-ethyl-N-(2-cyanomethoxycarbonylethyl)aniline (6.5 parts) $\lambda$max=486 nm (acetone).

When applied to polyester materials from aqueous dispersion, red shades with excellent wet and light fastness properties were seen.

The following examples of dyes of formula (Iaa):

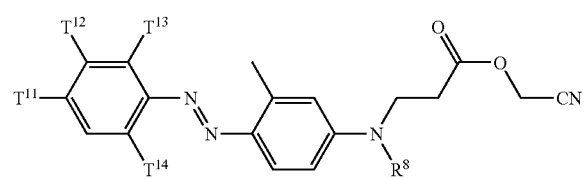

were prepared by the procedure of Example 1 (see Table 1)

TABLE 1

| Example | $T^{11}$ | $T^{12}$ | $T^{13}$ | $T^{14}$ | $R^8$ | $\lambda$max (nm) |
|---|---|---|---|---|---|---|
| 2 | —H | —H | —NO$_2$ | —H | —C$_2$H$_5$ | 479 |
| 3 | —H | —NO$_2$ | —H | —H | —C$_2$H$_5$ | 468 |
| 4 | —NO$_2$ | —H | —Cl | —H | —C$_2$H$_5$ | 508 |
| 5 | —Cl | —H | —NO$_2$ | —H | —C$_2$H$_5$ | 501 |
| 6 | —NO$_2$ | —H | —Br | —H | —C$_2$H$_5$ | 507 |
| 7 | —NO$_2$ | —H | —Cl | —Cl | —C$_2$H$_5$ | 450 |
| 8 | —NO$_2$ | —H | —Br | —Br | —C$_2$H$_5$ | 449 |
| 9 | —NO$_2$ | —H | —Cl | —Br | —C$_2$H$_5$ | 449 |
| 10 | —NO$_2$ | —Cl | —H | —Cl | —C$_2$H$_5$ | 518 |
| 11 | —NO$_2$ | —H | —CN | —H | —C$_2$H$_5$ | 534 |
| 12 | —NO$_2$ | —H | —CN | —Br | —C$_2$H$_5$ | 544 |
| 13 | —NO$_2$ | —H | —CN | —Cl | —C$_2$H$_5$ | 545 |
| 14 | —NO$_2$ | —H | —NO$_2$ | —H | —C$_2$H$_5$ | 535 |
| 15 | —NO$_2$ | —H | —Br | —NO$_2$ | —C$_2$H$_5$ | 542 |
| 16 | —NO$_2$ | —H | —Cl | —NO$_2$ | —C$_2$H$_5$ | 544 |
| 17 | —NO$_2$ | —H | —CN | —CN | —C$_2$H$_5$ | 582 |
| 18 | —NO$_2$ | —H | —CN | —NO$_2$ | —C$_2$H$_5$ | 590 |
| 19 | —NO$_2$ | —H | —H | —H | —C$_4$H$_9$ | 490 |
| 20 | —NO$_2$ | —H | —Cl | —H | —C$_4$H$_9$ | 513 |
| 21 | —NO$_2$ | —H | —Cl | —Cl | —C$_4$H$_9$ | 453 |
| 22 | —NO$_2$ | —H | —Cl | —Br | —C$_4$H$_9$ | 453 |
| 23 | —NO$_2$ | —H | —Br | —Br | —C$_4$H$_9$ | 452 |
| 24 | —NO$_2$ | —H | —CN | —H | —C$_4$H$_9$ | 539 |
| 25 | —NO$_2$ | —H | —NO$_2$ | —H | —C$_4$H$_9$ | 540 |
| 26 | —NO$_2$ | —H | —CN | —Br | —C$_4$H$_9$ | 549 |
| 27 | —NO$_2$ | —H | —CN | —Cl | —C$_4$H$_9$ | 548 |
| 28 | —NO$_2$ | —H | —Br | —NO$_2$ | —C$_4$H$_9$ | 548 |
| 29 | —NO$_2$ | —H | —Cl | —NO$_2$ | —C$_4$H$_9$ | 549 |
| 30 | —H | —H | —NO$_2$ | —H | —C$_4$H$_9$ | 483 |
| 31 | —NO$_2$ | —H | —CN | —CN | —C$_4$H$_9$ | 586 |
| 32 | —NO$_2$ | —H | —H | —H | —CH$_2$[C$_6$H$_5$] | 479 |
| 33 | —NO$_2$ | —H | —NO$_2$ | —H | —CH$_2$[C$_6$H$_5$] | 530 |
| 34 | —H | —H | —NO$_2$ | —H | —CH$_2$[C$_6$H$_5$] | 470 |
| 35 | —H | —NO$_2$ | —H | —H | —CH$_2$[C$_6$H$_5$] | 460 |
| 36 | —NO$_2$ | —H | —Cl | —H | —CH$_2$[C$_6$H$_5$] | 498 |
| 37 | —NO$_2$ | —H | —Cl | —Cl | —CH$_2$[C$_6$H$_5$] | 446 |
| 38 | —NO$_2$ | —H | —Br | —Br | —CH$_2$[C$_6$H$_5$] | 445 |
| 39 | —NO$_2$ | —H | —Br | —Cl | —CH$_2$[C$_6$H$_5$] | 444 |
| 40 | —NO$_2$ | —H | —CN | —H | —CH$_2$[C$_6$H$_5$] | 528 |
| 41 | —NO$_2$ | —H | —CN | —Br | —CH$_2$[C$_6$H$_5$] | 539 |
| 42 | —NO$_2$ | —H | —CN | —Cl | —CH$_2$[C$_6$H$_5$] | 539 |
| 43 | —NO$_2$ | —H | —Br | —NO$_2$ | —CH$_2$[C$_6$H$_5$] | 538 |
| 44 | —NO$_2$ | —H | —Cl | —NO$_2$ | —CH$_2$[C$_6$H$_5$] | 537 |
| 45 | —NO$_2$ | —H | —CN | —NO$_2$ | —CH$_2$[C$_6$H$_5$] | 580 |
| 46 | —NO$_2$ | —H | —CN | —CN | —CH$_2$[C$_6$H$_5$] | 577 |
| 47 | —NO$_2$ | —H | —H | —H | —C$_3$H$_7$ | 487 |
| 48 | —NO$_2$ | —H | —Cl | —H | —C$_3$H$_7$ | 509 |
| 49 | —NO$_2$ | —H | —Cl | —Cl | —C$_3$H$_7$ | 452 |
| 50 | —NO$_2$ | —H | —Cl | —Br | —C$_3$H$_7$ | 451 |
| 51 | —NO$_2$ | —H | —Br | —Br | —C$_3$H$_7$ | 452 |
| 52 | —NO$_2$ | —H | —CN | —H | —C$_3$H$_7$ | 536 |
| 53 | —NO$_2$ | —H | —NO$_2$ | —H | —C$_3$H$_7$ | 537 |
| 54 | —NO$_2$ | —H | —CN | —Br | —C$_3$H$_7$ | 546 |
| 55 | —NO$_2$ | —H | —CN | —Cl | —C$_3$H$_7$ | 548 |
| 56 | —NO$_2$ | —H | —Br | —NO$_2$ | —C$_3$H$_7$ | 544 |
| 57 | —NO$_2$ | —H | —Cl | —NO$_2$ | —C$_3$H$_7$ | 545 |
| 58 | —H | —H | —NO$_2$ | —H | —C$_3$H$_7$ | 480 |
| 59 | —NO$_2$ | —H | —CN | —CN | —C$_3$H$_7$ | 584 |
| 60 | —NO$_2$ | —H | —Cl | —H | —CH$_3$ | 504 |
| 61 | —NO$_2$ | —H | —CN | —H | —CH$_3$ | 529 |
| 62 | —NO$_2$ | —H | —Cl | —CN | —CH$_3$ | 543 |
| 63 | —NO$_2$ | —H | —Br | —CN | —CH$_3$ | 542 |
| 64 | —NO$_2$ | —H | —Br | —NO$_2$ | —CH$_3$ | 539 |

EXAMPLE 65

4-(2,6-dichloro-4-nitrophenylazo)-N-ethyl-N-(2-cyanomethoxy-carbonylethyl) aniline

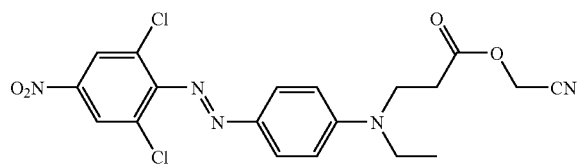

2,6-dichloro-4-nitroaniline (6.2 parts) was set stirring at 5° C. with a mixture of acetic acid and propionic acid, 86:14 (40 parts). Nitrosyl sulphuric acid 40% (11.4 parts) was added below 5° C. and the mixture was stirred for 30 minutes. The diazo solution was added gradually to a stirred coupling mixture of N-ethyl, N-2(cyanomethoxycarbonyl-ethyl)-aniline (8.3 parts), methanol (50 parts), water (300 parts) and sulphamic acid (1 part). After one hour the product was isolated by filtration, washed with cold water and dried to yield, 4-(2,6-dichloro-4-nitrophenylazo)-N-ethyl-N-(2-cyanomethoxycarbonylethyl)aniline (9.5 parts) λmax=432 nm (acetone).

When applied to polyester materials from aqueous dispersion, yellow brown shades with excellent wet and light fastness properties were seen.

The following examples of dyes of Formula (Iba)

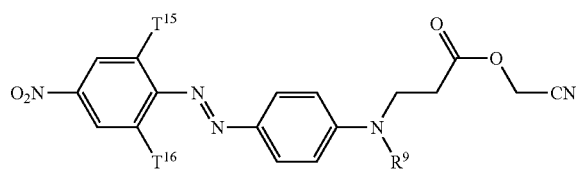

(Iba)

were prepared by the procedure of Example 65 (see Table 2)

TABLE 2

| Example | $T^{15}$ | $T^{16}$ | $R^9$ | λmax (nm) |
|---|---|---|---|---|
| 66 | —Cl | —Cl | —$C_3H_7$ | 433 |
| 67 | —Cl | —Cl | —$C_4H_9$ | 434 |
| 68 | —Cl | —Cl | —$CH_2[C_6H_5]$ | 420 |
| 69 | —Cl | —Cl | —$CH_3$ | 425 |
| 70 | —Cl | —Br | —$C_2H_5$ | 430 |
| 71 | —Cl | —Br | —$C_3H_7$ | 431 |
| 72 | —Cl | —Br | —$C_4H_9$ | 433 |
| 73 | —Cl | —Br | —$CH_2[C_6H_5]$ | 420 |
| 74 | —Cl | —Br | —$CH_3$ | 424 |
| 75 | —Br | —Br | —$C_2H_5$ | 430 |
| 76 | —Br | —Br | —$C_3H_7$ | 432 |
| 77 | —Br | —Br | —$C_4H_9$ | 431 |
| 78 | —Br | —Br | —$CH_2[C_6H_5]$ | 421 |
| 79 | —Br | —Br | —$CH_3$ | 424 |

EXAMPLE 80

4-(6-nitrobenzothiazol-yl-azo)-3-methyl-N-ethyl-N-(2-cyanomethoxycarbonylethyl) aniline

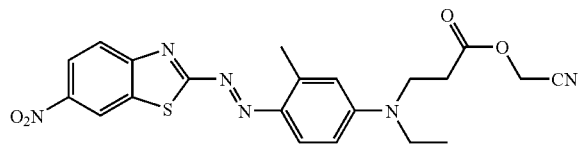

2-amino-6-nitrobenzothiazole (3.9 parts) was set stirring at 5° C. with a mixture of acetic acid and propionic acid, 86:14 (40 parts). Nitrosyl sulphuric acid 40% (7.6 parts) was added below 5° C. and the mixture was stirred for 1 hour. The diazo solution was added gradually to a stirred coupling mixture of N-ethyl, N-(2-cyanomethoxycarbonylethyl)-m-toluidine (5.9 parts), methanol (25 parts), water (200 parts) and sulphamic acid (0.5 parts). After one hour the product was isolated by filtration, washed with cold water and dried to yield, 4-(6-nitrobenzothiazol-yl-azo)-3-methyl-N-ethyl-N-(2-cyanomethoxycarbonyl ethyl)aniline (2.4 parts) λmax=545 nm (acetone).

When applied to polyester materials from aqueous dispersion, rubine shades with excellent wet and light fastness properties were seen.

The following examples of dyes of Formula (Iab):

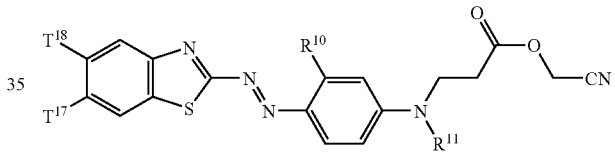

(Iab)

were prepared by the procedure of Example 80 (see Table 3)

TABLE 3

| Example | $T^{17}$ | $T^{18}$ | $R^{10}$ | $R^{11}$ | λmax nm |
|---|---|---|---|---|---|
| 81 | —$SO_2CH_3$ | —H | —$CH_3$ | —$CH_3$ | 527 |
| 82 | —$NO_2$ | —H | —$CH_3$ | —$CH_3$ | 543 |
| 83 | —$NO_2$ | —H | —$CH_3$ | —$C_3H_7$ | 545 |
| 84 | —$NO_2$ | —H | —$CH_3$ | —$C_4H_9$ | 548 |
| 85 | —$NO_2$ | —H | —$CH_3$ | —$CH_2[C_6H_5]$ | 538 |
| 86 | —Cl | —Cl | —$CH_3$ | —$C_2H_5$ | 526 |
| 87 | —Cl | —Cl | —$CH_3$ | —$CH_3$ | 522 |
| 88 | —Cl | —Cl | —$CH_3$ | —$C_3H_7$ | 528 |
| 89 | —Cl | —Cl | —$CH_3$ | —$C_4H_9$ | 530 |
| 90 | —Cl | —Cl | —$CH_3$ | —$CH_2[C_6H_5]$ | 521 |
| 91 | —$SO_2CH_3$ | —H | —$CH_3$ | —$C_3H_7$ | 531 |
| 92 | —$SO_2CH_3$ | —H | —$CH_3$ | —$C_4H_9$ | 533 |
| 93 | —$SO_2CH_3$ | —H | —$CH_3$ | —$CH_2[C_6H_5]$ | 525 |
| 94 | —SCN | —H | —$CH_3$ | —$C_2H_5$ | 534 |
| 95 | —SCN | —H | —$CH_3$ | —$CH_3$ | 530 |
| 96 | —SCN | —H | —$CH_3$ | —$C_3H_7$ | 535 |
| 97 | —SCN | —H | —$CH_3$ | —$C_4H_9$ | 537 |
| 98 | —SCN | —H | —$CH_3$ | —$CH_2[C_6H_5]$ | 529 |
| 99 | —$NO_2$ | —H | —H | —$C_4H_9$ | 535 |
| 100 | —$NO_2$ | —H | —H | —$CH_2[C_6H_5]$ | 525 |
| 101 | —SCN | —H | —H | —$C_4H_9$ | 523 |
| 102 | —SCN | —H | —H | —$CH_2[C_6H_5]$ | 516 |
| 103 | —Cl | —Cl | —H | —$C_4H_9$ | 519 |
| 104 | —Cl | —Cl | —H | —$CH_2[C_6H_5]$ | 509 |
| 105 | —$SO_2CH_3$ | —H | —H | —$C_4H_9$ | 521 |
| 106 | —$SO_2CH_3$ | —H | —H | —$CH_2[C_6H_5]$ | 512 |

EXAMPLE 107

4-(3,5-dinitrothiophen-yl-azo)-3-methyl-N-ethyl-N-(2-cyanomethoxycarbonylethyl) aniline

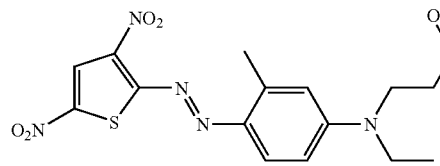

2-amino-3,5-dinitrothiophene (3.1 parts) was set stirring at 5° C. with a mixture of acetic acid and propionic acid, 86:14 (50 parts) Nitrosyl sulphuric acid 40% (5.7 parts) was added below 5° C. and the mixture was stirred for 30 mins. The diazo solution was added gradually to a stirred coupling mixture of N-ethyl, N-(2-cyanomethoxycarbonyethyl)-m-toluidine (4.0 parts), acetone (50 parts), water (300 parts) and sulphamic acid (0.5 parts). After one hour the product was isolated by filtration, washed with cold water and dried to yield, 4-(3,5-dinitrothiophen-yl-azo)-3-methyl-N-ethyl-N-(2-cyanomethoxycarbonyl-ethyl)aniline (3.0 parts) $\lambda$max=640 nm (acetone).

When applied to polyester materials from aqueous dispersion, blue shades with excellent wet and light fastness properties were seen.

The following examples of dyes of Formula (Iac):

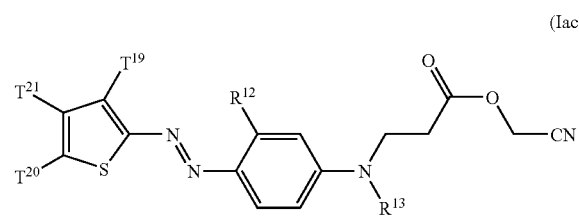

(Iac)

were prepared by the procedure of Example 107 (see Table 4)

TABLE 4

| Example | $T^{19}$ | $T^{20}$ | $T^{21}$ | $R^{12}$ | $R^{13}$ | $\lambda$max (nm) |
|---|---|---|---|---|---|---|
| 108 | —NO$_2$ | —NO$_2$ | —H | —H | —C$_2$H$_5$ | 620 |
| 109 | —NO$_2$ | —NO$_2$ | —H | —H | —C$_4$H$_9$ | 625 |
| 110 | —NO$_2$ | —NO$_2$ | —H | —H | —C$_3$H$_7$ | 622 |
| 111 | —NO$_2$ | —NO$_2$ | —H | —H | —CH$_2$[C$_6$H$_5$] | 611 |
| 112 | —NO$_2$ | —NO$_2$ | —H | —CH$_3$ | —C$_4$H$_9$ | 645 |
| 113 | —NO$_2$ | —NO$_2$ | —H | —CH$_3$ | —C$_3$H$_7$ | 640 |
| 114 | —NO$_2$ | —NO$_2$ | —H | —CH$_3$ | —CH$_2$[C$_6$H$_5$] | 632 |
| 115 | —COOC$_2$H$_5$ | —NO$_2$ | —H | —CH$_3$ | —C$_2$H$_5$ | 595 |
| 116 | —COOC$_2$H$_5$ | —NO$_2$ | —H | —H | —C$_4$H$_9$ | 583 |
| 117 | —COCH$_3$ | —NO$_2$ | —H | —CH$_3$ | —C$_2$H$_5$ | 599 |
| 118 | —COCH$_3$ | —NO$_2$ | —H | —CH$_3$ | —C$_4$H$_9$ | 603 |
| 119 | —COCH$_3$ | —NO$_2$ | —H | —H | —C$_4$H$_9$ | 585 |
| 120 | —CN | —NO$_2$ | —H | —CH$_3$ | —C$_2$H$_5$ | 604 |
| 121 | —CN | —NO$_2$ | —H | —CH$_3$ | —CH$_2$[C$_6$H$_5$] | 595 |
| 122 | —CN | —CHO | —CH$_3$ | —CH$_3$ | —C$_2$H$_5$ | 585 |
| 123 | —CN | —CHO | —Cl | —CH$_3$ | —C$_4$H$_9$ | 591 |
| 124 | —CN | —CHO | —Cl | —H | —C$_4$H$_9$ | 579 |
| 125 | —COOC$_2$H$_5$ | —NO$_2$ | —H | —H | —CH$_2$[C$_6$H$_5$] | 565 |
| 126 | —COOC$_2$H$_5$ | —NO$_2$ | —H | —CH$_3$ | —C$_4$H$_9$ | 601 |

EXAMPLE 127

4-(5-nitrobenzisothiazol-yl-azo)-3-methyl-N-ethyl-N-(2-cyanomethoxycarbonylethyl)aniline

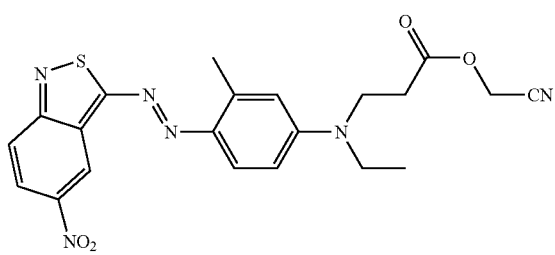

7-amino-5-nitrobenzoisothiazole (2.9 parts) was added to a mixture of sulphuric acid 98% (15 parts) and phosphoric acid (4 parts) stirring at room temperature. The mixture was heated to 55° C. and was stirred at that temperature for 30 mins. Nitrosyl sulphuric acid 40% (6.1 parts) was added below 5° C. and the mixture was stirred for 2 hrs.

The diazo solution was added gradually to a stirred coupling mixture of N-ethyl, N-(2-cyanomethoxycarbonyl-ethyl)-m-toluidine (4.8 parts), acetone (50 parts), water (100 parts) and sulphamic acid (0.5 parts). Sodium acetate was added to increase the pH to 4.0 and the mixture was stirred for 1 hour. The product was isolated by filtration, washed with cold water and dried to yield, 4-(5-nitrobenzisothiazol-yl-azo)-3-methyl-N-ethyl-N-(2-cyanomethoxycarbonyl-ethyl)aniline (2.4 parts) $\lambda$max=601 nm (acetone).

When applied to polyester materials from aqueous dispersion, blue shades with excellent wet and light fastness properties were seen.

The following examples of dyes of Formula (Iad)

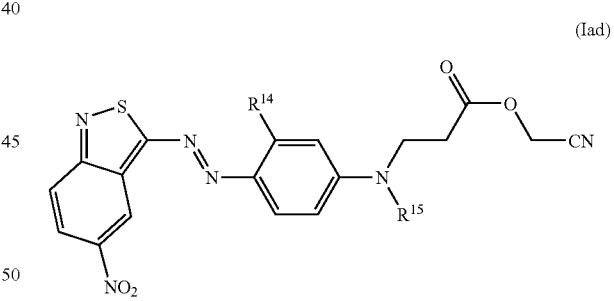

(Iad)

were prepared by the procedure of Example 127 (see Table 5)

TABLE 5

| Example | $R^{14}$ | $R^{15}$ | $\lambda$max (nm) |
|---|---|---|---|
| 128 | —H | —C$_2$H$_5$ | 588 |
| 129 | —H | —CH$_2$[C$_6$H$_5$] | 578 |
| 130 | —H | —C$_4$H$_9$ | 589 |
| 131 | —CH$_3$ | —C$_3$H$_7$ | 603 |
| 132 | —CH$_3$ | —CH$_2$[C$_6$H$_5$] | 593 |
| 133 | —CH$_3$ | —C$_4$H$_9$ | 608 |

EXAMPLE 134

4-(5-nitrothiazol-yl-azo)-N-butyl-N-(2-cyanomethoxy-carbonylethyl)aniline

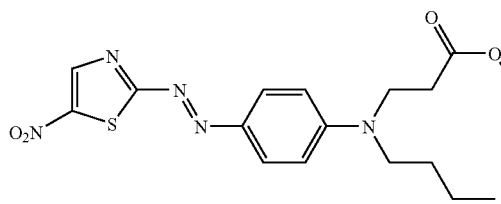

2-amino-5-nitrothiazole (2.9 parts) was set stirring at 5° C. with a mixture of acetic acid and propionic acid, 86:14 (50 parts). Nitrosyl sulphuric acid 40% (7.0 parts) was added below 5° C. and the mixture was stirred for 30 mins. The diazo solution was added gradually to a stirred coupling mixture of N-butyl, N-2(cyanomethoxycarbonylethyl)-aniline (5.2 parts), acetone (50 parts), water (200 parts) and sulphamic acid (0.5 parts). After one hour the product was isolated by filtration, washed with cold water and dried to yield, 4-(5-nitrothiazol-yl-azo)-N-butyl-N-(2-cyanomethoxycarbonylethyl)aniline (2.9 parts) λmax=571 nm (acetone).

When applied to polyester materials from aqueous dispersion, blue shades with excellent wet and light fastness properties were seen.

The following examples of dyes of Formula (Iae)

(Iae)

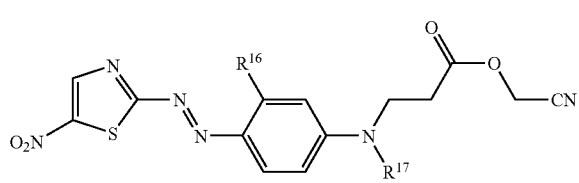

were prepared by the procedure of Example 134 (see Table 6)

TABLE 6

| Example | $R^{16}$ | $R^{17}$ | λmax (nm) |
|---|---|---|---|
| 135 | —H | —CH$_2$[C$_6$H$_5$] | 557 |
| 136 | —CH$_3$ | —C$_2$H$_5$ | 575 |

TABLE 6-continued

| Example | $R^{16}$ | $R^{17}$ | λmax (nm) |
|---|---|---|---|
| 137 | —CH$_3$ | —C$_4$H$_9$ | 582 |
| 138 | —CH$_3$ | —CH$_2$[C$_6$H$_5$] | 569 |

EXAMPLE 139

4-(2-chloro-4-nitrophenylazo)-3-acetylamino-N-ethyl-N-(2-cyanomethoxycarbonylethyl)-aniline

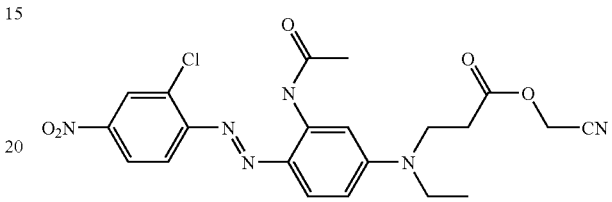

2-chloro-4-nitroaniline (3.5 parts) was set stirring at 5° C. with a mixture of acetic acid and propionic acid, 86:14 (40 parts). Nitrosyl sulphuric acid 40% (7.0 parts) was added below 5° C. and the mixture was stirred for 30 minutes.

The diazo solution was added gradually to a stirred coupling mixture of 3(N-ethyl, N-cyanomethoxycarbonylethyl)-amino-acetanilide (6.3 parts), methanol (40 parts), water (200 parts) and sulphamic acid (1 part). After two hours the product was isolated by filtration, washed with cold water and dried to yield, 4-(2-chloro-4-nitrophenylazo)-3-acetylamino-N-ethyl-N-(2-cyanomethoxy-carbonylethyl)-aniline (4.1 parts) λmax=525 nm (acetone).

When applied to polyester materials from aqueous dispersion, rubine shades with excellent wet and light fastness properties were seen.

The following examples of dyes of formula (Iea):

(Iea)

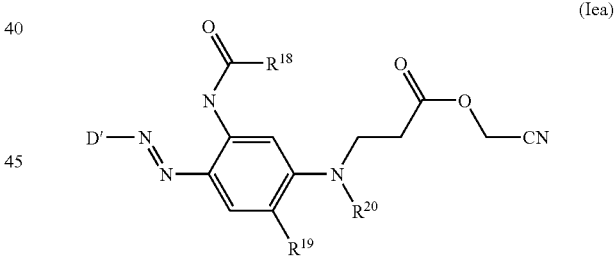

were prepared by the procedure of Example 139 (see Table 7)

TABLE 7

| Example | D' | $R^{18}$ | $R^{19}$ | $R^{20}$ | λmax (nm) |
|---|---|---|---|---|---|
| 140 | 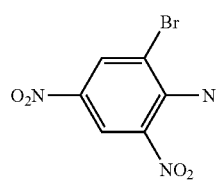 | —CH$_3$ | —H | —C$_2$H$_5$ | 550 |

TABLE 7-continued
| Example | D' | R¹⁸ | R¹⁹ | R²⁰ | λmax (nm) |
|---|---|---|---|---|---|
| 141 | 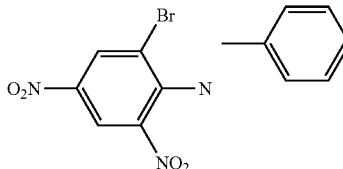 | 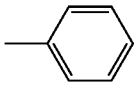 | —H | —C₂H₅ | 553 |
| 142 | 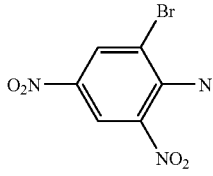 | —CH₃ | —H | —C₄H₉ | 552 |
| 143 | 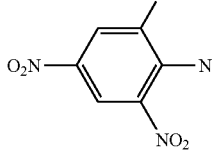 | —C₂H₅ | —H | —C₂H₅ | 550 |
| 144 | 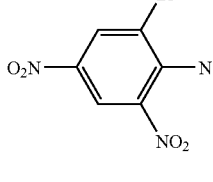 | —CH₃ | —OCH₃ | —C₂H₅ | 596 |
| 145 | 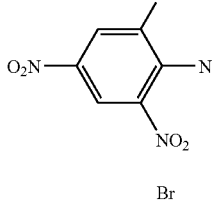 | —CH₃ | —OCH₃ | —C₄H₉ | 603 |
| 146 | 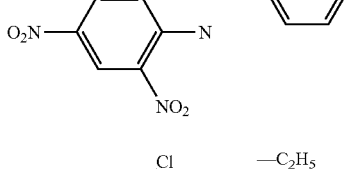 | 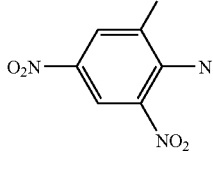 | —OCH₃ | —H | 600 |
| 147 | 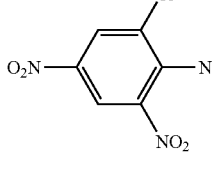 | —C₂H₅ | —OCH₃ | —C₂H₅ | 596 |
| 148 |  | —CH₃ | —H | —C₄H₉ | 551 |

TABLE 7-continued
| Example | D' | R[18] | R[19] | R[20] | λmax (nm) |
|---|---|---|---|---|---|
| 149 | 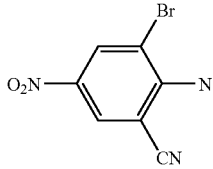 | —CH$_3$ | —H | —C$_2$H$_5$ | 574 |
| 150 | 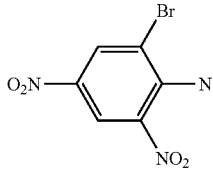 | —C$_2$H$_5$ | —H | —C$_2$H$_5$ | 550 |
| 151 | 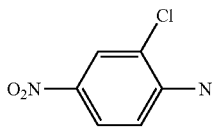 | —CH$_3$ | —H | —C$_4$H$_9$ | 525 |
| 152 | 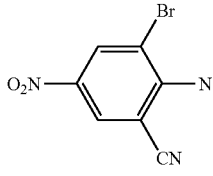 | —CH$_3$ | —OCH$_3$ | —C$_2$H$_5$ | 628 check |
| 153 | 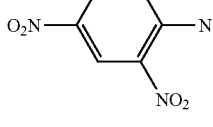 | —CH$_3$ | —H | —C$_2$H$_5$ | 539 |
| 154 | 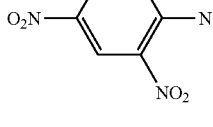 | —CH$_3$ | —OCH$_3$ | —C$_2$H$_5$ | 574 |
| 155 | 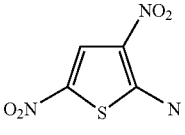 | —CH$_3$ | —H | —C$_2$H$_5$ | 634 |
| 156 | 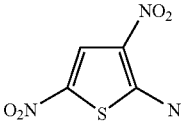 | —CH$_3$ | —OCH$_3$ | —C$_2$H$_5$ | 660 |

EXAMPLE 157

4-(2-cyano-4-nitrophenylazo)-3-methyl-N-ethyl-N-(4-cyanomethoxycarbonylbutyl)-aniline

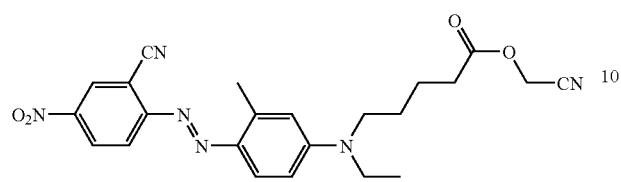

2-cyano-4-nitroaniline (3.2 parts) was set stirring at 5° C. with a mixture of acetic acid and propionic acid, 86:14 (50 parts). Nitrosyl sulphuric acid 40% (7.6 parts) was added below 5° C. and the mixture was stirred for 30 minutes.

The diazo solution was added gradually to a stirred coupling mixture of N-ethyl, N-(4-cyanomethoxycarbonylbutyl)-m-toluidine (6.0 parts), methanol (50 parts), water (200 parts) and sulphamic acid (1 part). After two hours the product was isolated by filtration, washed with cold water and dried to yield, 4-(2-cyano-4-nitrophenylazo)-3-methyl-N-ethyl-N-(4-cyanomethoxycarbonylbutyl)-aniline. (5.3 parts) λmax=548 nm (acetone).

When applied to polyester materials from aqueous dispersion, rubine shades with excellent wet and light fastness properties were seen.

The following examples of dyes of Formula (Iaf)

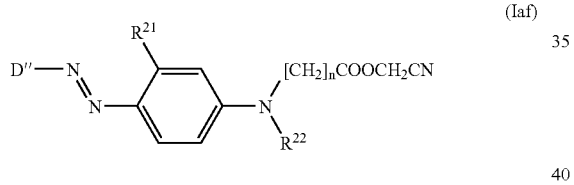

were prepared by the procedure of Example 157 (see Table 8)

TABLE 8

| Example | D″ | $R^{21}$ | $R^{22}$ | n | λmax (nm) |
|---|---|---|---|---|---|
| 158 | $O_2N$—⬡—N | —H | —$C_2H_5$ | 4 | 491 |
| 159 | $O_2N$—⬡—N | —H | —$C_2H_5$ | 3 | 486 |
| 160 | $O_2N$–[thiophene-$NO_2$]–N | —$CH_3$ | —$C_2H_5$ | 4 | 649 |
| 161 | $O_2N$–[thiophene-$NO_2$]–N | —$CH_3$ | —$C_2H_5$ | 3 | 642 |

TABLE 8-continued

| Example | D″ | $R^{21}$ | $R^{22}$ | n | λmax (nm) |
|---|---|---|---|---|---|
| 162 | $O_2N$–⬡(Br)(CN)–N | —$CH_3$ | —$C_2H_5$ | 4 | 561 |
| 163 | $O_2N$–⬡(Br)(CN)–N | —$CH_3$ | —$C_2H_5$ | 3 | 556 |
| 164 | $O_2N$–⬡(Br)(CN)–N | —$CH_3$ | —$C_3H_7$ | 3 | 558 |
| 165 | Cl,Cl-benzothiazole | —$CH_3$ | —$C_2H_5$ | 4 | 535 |
| 166 | $O_2N$–⬡(CN)–N | —$CH_3$ | —$C_2H_5$ | 4 | 548 |
| 167 | $O_2N$–⬡(CN)–N | —$CH_3$ | —$C_2H_5$ | 3 | 536 |
| 168 | $O_2N$–⬡(CN)–N | —H | —$C_2H_5$ | 4 | 529 |

EXAMPLE 169

4-(2-cyano-4-nitrophenylazo)-3-methyl-N-ethyl-N-(2-(1-cyanoethoxy) carbonylethyl)-aniline

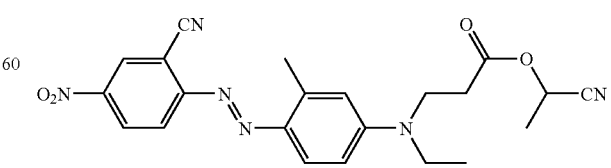

2-cyano-4-nitroaniline (2.1 parts) was set stirring at 5° C. with a mixture of acetic acid and propionic acid, 86:14 (40 parts). Nitrosyl sulphuric acid 40% (4.9 parts) was added below 5° C. and the mixture was stirred for 30 minutes.

The diazo solution was added gradually to a stirred coupling mixture of N-ethyl, N-(2-(1-cyanoethoxy)carbonylethyl)-m-toluidine (3.7 parts), acetone (50 parts), water (300 parts) and sulphamic acid (1 part). After two hours the product was isolated by filtration, washed with cold water and dried to yield, 4-(2-cyano-4-nitrophenylazo)-3-methyl-N-ethyl-N-(2-(1-cyanoethoxy)carbonylethyl)-aniline (3.5 parts) λmax=534 nm (acetone).

When applied to polyester materials from aqueous dispersion, rubine shades with excellent wet and light fastness properties were seen.

The following examples of dyes of Formula (Ida)

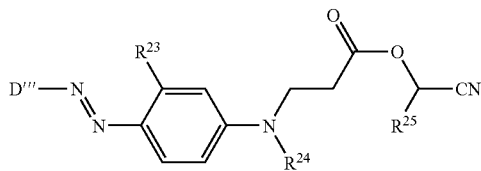

(Ida)

were prepared by the procedure of Example 169 (see Table 9)

TABLE 9

| Example | D''' | $R^{23}$ | $R^{24}$ | $R^{25}$ | λmax (nm) |
|---|---|---|---|---|---|
| 170 | $O_2N$-(phenyl with CN)-N | —$CH_3$ | —$C_2H_5$ | phenyl | 533 |
| 171 | $O_2N$-(phenyl with CN, Br)-N | —$CH_3$ | —$C_2H_5$ | phenyl | 544 |
| 172 | $O_2N$-(phenyl with Cl)-N | —$CH_3$ | —$C_2H_5$ | phenyl | 507 |
| 173 | $O_2N$-(phenyl with 2 Cl)-N | —$CH_3$ | —$C_2H_5$ | phenyl | 446 |
| 174 | $O_2N$-thiazole-N | —$CH_3$ | —$C_2H_5$ | phenyl | 580 |
| 175 | $O_2N$-(phenyl with CN)-N | —H | —$C_2H_5$ | phenyl | 523 |
| 176 | $O_2N$-(phenyl with Cl)-N | —H | —$C_2H_5$ | phenyl | 494 |
| 177 | $O_2N$-(phenyl with CN)-N | —H | —$C_2H_5$ | —$CH_3$ | 522 |

TABLE 9-continued

| Example | D''' | R²³ | R²⁴ | R²⁵ | λmax (nm) |
|---|---|---|---|---|---|
| 178 | O₂N—C₆H₃—N (4-nitrophenyl) | —H | —C₂H₅ | —CH₃ | 473 |
| 179 | O₂N—C₆H₃—N (4-nitrophenyl) | —H | —C₄H₉ | —CH₃ | 480 |
| 180 | 2-Cl-4-NO₂-phenyl-N | —H | —C₂H₅ | —CH₃ | 494 |
| 181 | 2,6-diCl-4-NO₂-phenyl-N | —H | —C₂H₅ | —CH₃ | 439 |
| 182 | 2,6-diCl-4-NO₂-phenyl-N | —H | —C₄H₉ | —CH₃ | 441 |
| 183 | 2-NO₂-4-NO₂-phenyl-N | —H | —C₂H₅ | —CH₃ | 521 |
| 184 | 6-nitrobenzothiazol-2-yl-N | —H | —C₂H₅ | —CH₃ | 533 |
| 185 | 5-nitrobenzisothiazol-3-yl-N | —H | —C₂H₅ | —CH₃ | 590 |
| 186 | 2,6-diCl-4-NO₂-phenyl-N | —CH₃ | —C₂H₅ | —CH₃ | 449 |
| 187 | 3-Br-5-NO₂-2-CN-phenyl-N | —CH₃ | —C₂H₅ | —CH₃ | 544 |

TABLE 9-continued

| Example | D''' | R²³ | R²⁴ | R²⁵ | λmax (nm) |
|---|---|---|---|---|---|
| 188 | (5-nitro-thiazol-2-yl) | —CH₃ | —C₂H₅ | —CH₃ | 581 |
| 189 | (6-nitro-benzothiazol-2-yl) | —CH₃ | —C₂H₅ | —CH₃ | 544 |
| 190 | (2,4-dinitrophenyl) | —CH₃ | —C₂H₅ | —CH₃ | 533 |
| 191 | (5-nitro-benzisothiazol-3-yl) | —CH₃ | —C₂H₅ | —CH₃ | 601 |
| 192 | (2-chloro-4-nitrophenyl) | —CH₃ | —C₂H₅ | —CH₃ | 506 |
| 193 | (3,5-dinitrothiophen-2-yl) | —H | —C₂H₅ | —CH₃ | 640 |

EXAMPLE 194

4-(2-chloro-4-nitrophenylazo)-N-ethyl-N-(2-cyanomethoxycarbonylpropyl)-aniline

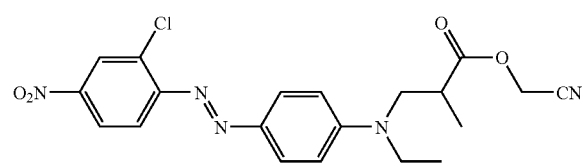

2-chloro-4-nitroaniline (parts) was set stirring at 5° C. with a mixture of acetic acid and propionic acid, 86:14 (40 parts). Nitrosyl sulphuric acid 40% (4.9 parts) was added below 5° C. and the mixture The diazo solution was stirred for 30 minutes.

The diazo solution was added gradually to a stirred coupling mixture of N-ethyl, N-2-(cyanomethoxycarbonylpropyl)-aniline (parts), acetone (50 parts), water (300 parts) and sulphamic acid (1 part). After two hours the product was isolated by filtration, washed with cold water and dried to yield, 4-(2-chloro-4-nitrophenylazo)-N-ethyl-N-(2-cyanomethoxycarbonylpropyl)-aniline (3.5 parts) λmax=534 nm (acetone).

When applied to polyester materials from aqueous dispersion, red shades with excellent wet and light fastness properties were seen.

The following examples of dyes of Formula (Ica)

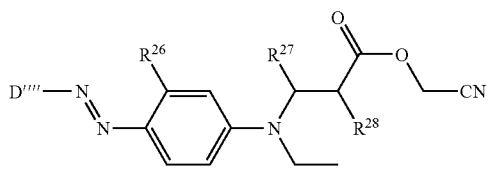

(Ica)

were prepared by the procedure of Example 194 (see Table 10)

TABLE 10

| Example | D'''' | R²⁶ | R²⁷ | R²⁸ | λmax (nm) |
|---|---|---|---|---|---|
| 195 | O₂N—⟨benzene: CN, N⟩ | —H | —H | —CH₃ | 521 |
| 196 | O₂N—⟨benzene⟩—N | —H | —H | —CH₃ | 473 |
| 197 | O₂N—⟨benzene: Cl, Cl⟩—N | —H | —H | —CH₃ | 440 |
| 198 | O₂N—⟨benzene: NO₂⟩—N | —H | —H | —CH₃ | 521 |
| 199 | O₂N—⟨thiazole⟩—N | —H | —H | —CH₃ | 569 |
| 200 | O₂N—⟨benzene: Cl⟩—N | —CH₃ | —H | —CH₃ | 505 |
| 201 | O₂N—⟨benzene: Cl, Cl⟩—N | —CH₃ | —H | —CH₃ | 448 |
| 202 | O₂N—⟨benzene: CN⟩—N | —CH₃ | —H | —CH₃ | 532 |
| 203 | O₂N—⟨benzene: CN, Br⟩—N | —CH₃ | —H | —CH₃ | 541 |
| 204 | O₂N—⟨thiazole⟩—N | —CH₃ | —H | —CH₃ | 579 |
| 205 | O₂N—⟨benzene: NO₂⟩—N | —CH₃ | —H | —CH₃ | 525 |

TABLE 10-continued

| Example | D'''' | R²⁶ | R²⁷ | R²⁸ | λmax (nm) |
|---|---|---|---|---|---|
| 206 | 6-nitrobenzothiazol-2-yl | —CH₃ | —H | —CH₃ | 541 |
| 207 | 5-nitrobenzo[c]isothiazol-3-yl | —CH₃ | —H | —CH₃ | 599 |
| 208 | 5-nitrobenzo[c]isothiazol-3-yl | —H | —H | —CH₃ | 588 |
| 209 | 2-cyano-4-nitrophenyl | —CH₃ | —CH₃ | —H | 535 |
| 210 | 2-cyano-6-bromo-4-nitrophenyl | —CH₃ | —CH₃ | —H | 544 |
| 211 | 5-nitrothiazol-2-yl | —CH₃ | —CH₃ | —H | 594 |
| 212 | 6-nitrobenzothiazol-2-yl | —CH₃ | —CH₃ | —H | 549 |

EXAMPLE 213

4-(4-nitrophenylazo)-N-ethyl-N-(2-(1-cyanoethoxy) carbonylpropyl)-aniline

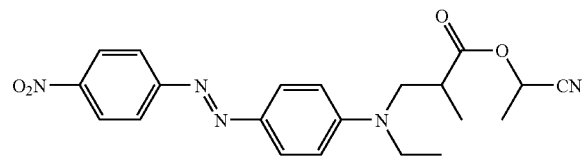

4-nitroaniline (2.0 parts) was set stirring at 5° C. with a mixture of acetic acid and propionic acid, 86:14 (50 parts). Nitrosyl sulphuric acid 40% (5.7 parts) was added below 5° C. and the mixture was stirred for 30 minutes.

The diazo solution was added gradually to a stirred coupling mixture of N-ethyl, N-(2-(1-cyanoethoxy)carbonylpropyl)-aniline (4.7 parts), acetone (50 parts), water (200 parts) and sulphamic acid (1 part). After two hours the product was isolated by filtration, washed with cold water and dried to yield, 4-(4-nitrophenylazo)-N-ethyl-N-(2-(1-cyanoethoxy)carbonylpropyl)-aniline (2.9 parts) λmax=473 nm (acetone).

When applied to polyester materials from aqueous dispersion, scarlet shades with excellent wet and light fastness properties were seen.

The following examples of dyes of Formula (Ih):

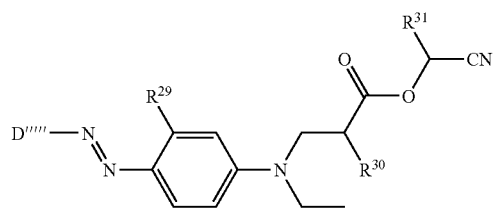

were prepared by the procedure of Example 213 (see Table 11)

TABLE 11

| Example | D''''' | R²⁹ | R³⁰ | R³¹ | λmax (nm) |
|---|---|---|---|---|---|
| 214 | 2-CN, 4-O₂N-phenyl | —H | —CH₃ | —CH₃ | 519 |
| 215 | 2-CN, 4-O₂N-phenyl | —CH₃ | —CH₃ | —CH₃ | 504 |
| 216 | 2-CN, 4-O₂N-phenyl | —CH₃ | —CH₃ | —CH₃ | 531 |
| 217 | 2-CN, 3-Br, 4-O₂N-phenyl | —CH₃ | —CH₃ | —CH₃ | 537 |
| 218 | 5-O₂N-benzisothiazol-3-yl | —CH₃ | —CH₃ | —CH₃ | 597 |
| 219 | 2-Br, 4-O₂N, 5-NO₂-phenyl | —H | —CH₃ | —CH₃ | 517 |
| 220 | 2,3-Cl₂, 4-O₂N-phenyl | —H | —CH₃ | —CH₃ | 428 |
| 221 | 2-Cl, 3-Br, 4-O₂N-phenyl | —H | —CH₃ | —CH₃ | 428 |
| 222 | 2,5-Cl₂, 4-O₂N-phenyl | —CH₃ | —CH₃ | —CH₃ | 449 |
| 223 | 2-Br, 4-O₂N, 5-NO₂-phenyl | —CH₃ | —CH₃ | —CH₃ | 539 |
| 224 | 2-NO₂, 4-O₂N-phenyl | —CH₃ | —CH₃ | —CH₃ | 524 |

EXAMPLE 225

4-(2-cyano-4-nitrophenylazo)-N-ethyl-N-(1-cyanomethoxycarbonylethyl)-m-toluidine

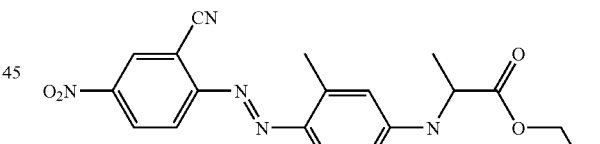

2-cyano-4-nitroaniline (3.1 parts) was set stirring at 5° C. with a mixture of acetic acid and propionic acid, 86:14 (40 parts). Nitrosyl sulphuric acid 40% (6.6 parts) was added below 5° C. and the mixture was stirred for 30 minutes.

The diazo solution was added gradually to a stirred coupling mixture of N-ethyl, N-(1-cyanomethoxycarbonylethyl)-m-toluidine (4.1 parts), methanol (40 parts), water (200 parts) and sulphamic acid (1 part). After two hours the product was isolated by filtration, washed with cold water and dried to yield, 4-(2-cyano-4-nitrophenylazo)-N-ethyl-N-(1-cyanomethoxycarbonylethyl)-m-toluidine (3.9 parts) λmax=510 nm (acetone).

When applied to polyester materials from aqueous dispersion, red shades with excellent wet and light fastness properties were seen.

The invention claimed is:

1. Dyestuff of the formula I

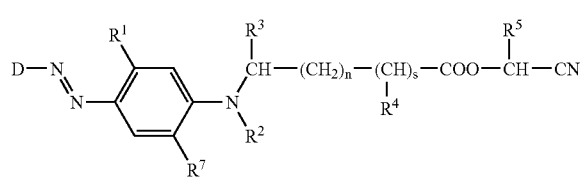

wherein
D is a group of the formula (IIa)

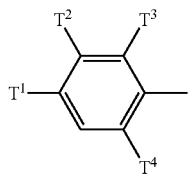

wherein
$T^1$, $T^2$ and $T^3$ are, independently, hydrogen, halogen or nitro;
$T^4$ is hydrogen, halogen, cyano or nitro;
wherein at least one of $T^1$, $T^2$, $T^3$ and $T^4$ is not hydrogen;
or a group of the formula (IIb)

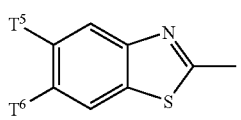

wherein
$T^5$ is hydrogen or halogen; and
$T^6$ is hydrogen, —$SO_2CH_3$, —SCN or nitro;
wherein at least one of $T^5$ and $T^6$ is not hydrogen;
or a group of the formula (IIc)

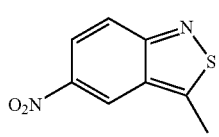

or a group of the formula (IId)

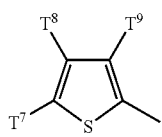

wherein
$T^7$ is nitro, —CHO or a group of the formula

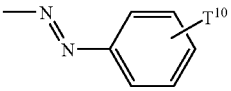

wherein $T^{10}$ is —H, halogen, nitro and cyano;
$T^8$ is hydrogen or halogen; or
$T^9$ is nitro, cyano, —$COCH_3$ or —$COOT^{10'}$, wherein $T^{10'}$ is ($C_1$-$C_4$)-alkyl;
or a group of the formula (IIe)

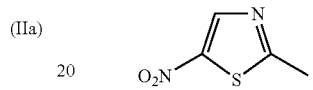

$R^1$ is hydrogen, ($C_1$-$C_4$)-alkyl or —$NHCOR^6$, where $R^6$ is ($C_1$-$C_4$)-alkyl or phenyl;
$R^2$ is unsubstituted ($C_1$-$C_6$)-alkyl, substituted ($C_1$-$C_6$)-alkyl, benzyl or phenylethyl and wherein said substituted ($C_1$-$C_6$)-alkyl is substituted by hydroxyl, ($C_1$-$C_4$)-alkoxy or halogen;
$R^3$ is hydrogen or methyl;
$R^4$ is hydrogen or methyl;
$R^5$ is hydrogen, methyl or phenyl;
$R^7$ is hydrogen, chloro, methoxy or ethoxy;
n is 0, 1 or 2;
s is 0 or 1;
with the proviso that
in the case $R^1$, $R^3$, $R^4$, $R^5$ and $R^7$ are hydrogen and n=0
D is a group of the formula (IIc), (IId), (IIe) or (IIa) wherein $T^1$ is not nitro
if $T^2$, $T^3$ and $T^4$ are hydrogen,
if $T^2$ and $T^3$ are hydrogen and $T^4$ is chlorine or cyano and
if $T^2$ and $T^4$ are hydrogen and $T^3$ is chlorine; and
with the further proviso that
in the case $R^1$ is methyl, $R^3$, $R^4$, $R^5$ and $R^7$ are hydrogen and n=0 then
$R^2$ is unsubstituted ($C_1$-$C_6$)-alkyl.

2. Dyestuff according to claim 1 of the formula (Ia)

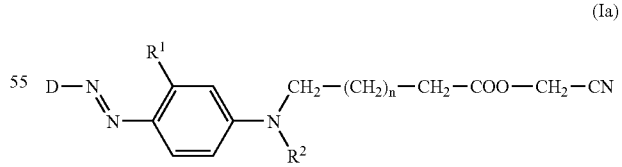

wherein
D is a group of the formulae (IIa), (IIb), (IIc), (IId) or (IIe);
$R^1$ is ($C_1$-$C_4$)-alkyl;
$R^2$ is unsubstituted ($C_1$-$C_6$)-alkyl, benzyl or phenylethyl; and
n is 0, 1 or 2.

3. Dyestuff according to claim 1 of the formula (Ib)

(Ib)

wherein
- $T^{3'}$ is bromo or chloro; and
- $R^2$ is unsubstituted $(C_1$-$C_6)$-alkyl, substituted $(C_1$-$C_6)$-alkyl, benzyl or phenylethyl and wherein said substituted $(C_1$-$C_6)$-alkyl is substituted by hydroxyl, $(C_1$-$C_4)$-alkoxy or halogen.

4. Dyestuff according to claim 1 of the formula (Ic)

(Ic)

wherein
- D is a group of the formulae (IIa), (IIb), (IIc), (IId) or (IIe);
- $R^1$ is hydrogen, $(C_1$-$C_4)$-alkyl or —NHCOR$^6$, where $R^6$ is $(C_1$-$C_4)$-alkyl or phenyl;
- $R^2$ is unsubstituted $(C_1$-$C_6)$-alkyl, substituted $(C_1$-$C_6)$-alkyl, benzyl or phenylethyl and wherein said substituted $(C_1$-$C_6)$-alkyl is substituted by hydroxyl, $(C_1$-$C_4)$-alkoxy or halogen; and
- $R^3$ is hydrogen and $R^4$ is methyl or $R^3$ is methyl and $R^4$ is hydrogen.

5. Dyestuff according to claim 1 of the formula (Id)

(Id)

wherein
- D is a group of the formulae (IIa), (IIb), (IIc), (IId) or (IIe);
- $R^1$ is hydrogen, $(C_1$-$C_4)$-alkyl or —NHCOR$^6$, where $R^6$ is $(C_1$-$C_4)$-alkyl or phenyl;
- $R^2$ is unsubstituted $(C_1$-$C_6)$-alkyl, substituted $(C_1$-$C_6)$-alkyl, benzyl or phenylethyl and wherein said substituted $(C_1$-$C_6)$-alkyl is substituted by hydroxyl, $(C_1$-$C_4)$-alkoxy or halogen; and
- $R^5$ is methyl or phenyl.

6. Dyestuff according to claim 1 of the formula (Ie)

(Ie)

wherein
- D is a group of the formulae (IIa), (IIb), (IIc), (IId) or (IIe);
- $R^2$ is unsubstituted $(C_1$-$C_6)$-alkyl, substituted $(C_1$-$C_6)$-alkyl, benzyl or phenylethyl and wherein said substituted $(C_1$-$C_6)$-alkyl is substituted by hydroxyl, $(C_1$-$C_4)$-alkoxy or halogen;
- $R^6$ is $(C_1$-$C_4)$-alkyl or phenyl;
- $R^7$ is chloro, methoxy or ethoxy; and
- n is 0, 1 or 2.

7. Dyestuff according to claim 1 of the formula (If)

(If)

wherein
- $R^2$ is unsubstituted $(C_1-C_6)$-alkyl, substituted $(C_1-C_6)$-alkyl, benzyl or phenylethyl and wherein said substituted $(C_1-C_6)$-alkyl is substituted by hydroxyl, $(C_1-C_4)$-alkoxy or halogen;
- $R^8$ is nitro; and
- n is 0, 1 or 2.

8. Dyestuff according to claim 1 of the formula (Ig)

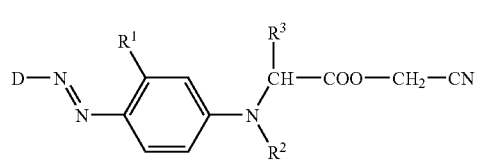

wherein
- D is a group of the formulae (IIa), (IIb), (IIc), (IId) or (IIe);
- $R^1$ is hydrogen, $(C_1-C_4)$-alkyl or —NHCOR$^6$, where $R^6$ is $(C_1-C_4)$-alkyl or phenyl;
- $R^2$ is unsubstituted $(C_1-C_6)$-alkyl, substituted $(C_1-C_6)$-alkyl, benzyl or phenylethyl and wherein said substituted $(C_1-C_6)$-alkyl is substituted by hydroxyl, $(C_1-C_4)$-alkoxy or halogen; and
- $R^3$ is hydrogen or methyl.

9. Process for the preparation of a dyestuff as claimed in claim 1, which comprises diazotizing an amine of the formula III $$D\text{-}NH_2 \qquad (III)$$

wherein D is a group of the formulae (IIa), (IIb), (IIc), (IId) or (IIe), and coupling onto a compound of the formula IV

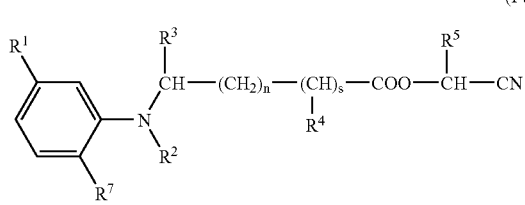

wherein $R^1$, $R^2$, $R^3$, $R^4$, $R^5$ and $R^7$ are defined in claim 1.

10. A process for dyeing and printing of synthetic textile material and fibre blends thereof which comprises contacting the dyestuff as claimed in claim 1 with the material.

* * * * *